United States Patent [19]
Allenbaugh, Jr.

[11] 3,940,107
[45] Feb. 24, 1976

[54] ROTARY VALVE WITH SPRING CLUTCH

[75] Inventor: George G. Allenbaugh, Jr., Wadsworth, Ohio

[73] Assignee: Premier Industrial Corporation, Cleveland, Ohio

[22] Filed: Sept. 6, 1974

[21] Appl. No.: 503,694

[52] U.S. Cl. .................. 251/297; 251/315; 192/8 C
[51] Int. Cl.[2] .......................................... F16K 5/08
[58] Field of Search ............. 137/637.3, 315, 637.5, 137/DIG. 2; 251/304, 309, 383, 384.2, 297; 192/8 C, 12 BA, 17 D, 89 R

[56] References Cited
UNITED STATES PATENTS

| | | | |
|---|---|---|---|
| 1,686,682 | 10/1928 | Coughlin | 192/8 C |
| 2,768,806 | 10/1956 | Koehler | 251/297 X |
| 3,134,405 | 5/1964 | White et al. | 251/297 X |
| 3,306,572 | 2/1967 | Dove | 251/297 |
| 3,307,663 | 3/1967 | Lvenberger | 192/8 C |
| 3,827,671 | 8/1974 | Bolden | 251/297 X |

*Primary Examiner*—Martin P. Schwadron
*Assistant Examiner*—Robert J. Miller
*Attorney, Agent, or Firm*—Isler & Ornstein

[57] ABSTRACT

A fluid flow valve, particularly of the ball type, with an improved seal and mounting adapter arrangement to permit the valve to be uncoupled in place and swung out or completely removed for repair of maintenance or replacement without disturbing or disconnecting any other portion of the fluid flow system. The valve also includes an improved valve modulating control arrangement which includes frictional locking means coupling the valve control mechanism to the valve member for flow adjustment; but acting to lock the flow adjusting elements and the valve member itself against any significant change in flow control position in response to flow pressures tending to cause an angular shift or rotation of position of the valve element.

7 Claims, 8 Drawing Figures

ROTARY VALVE WITH SPRING CLUTCH

BACKGROUND OF THE INVENTION

The use of liquid flow control valves, particularly of the rotatable type, such as the ball type, is well known to the art. Such valves are used at various points in a variety of chemical and process industries as well as in other fields, such as fire control, for the purpose of controlling and adjusting the amount or volume of liquid flowing through or being discharged from a flow line. In the discussion which follows, particular reference will be made to the ball type of flow control valve, but it will be understood that some aspects of the invention are applicable to any form of rotary valve member in which modulation of the flow control subjects the valve member to flow pressures which tend to change the position of the valve member unless some means is provided to prevent this from happening. Although the discussion will be directed primarily to manually controlled valves, as these are the most commonly used, it will be understood that the principles of the invention could apply equally to power-controlled or remote-controlled valves where the problems encountered may be similar to those encountered in manual operation.

The prior art structure of valves can broadly be classified into two categories; the flanged body type and the threaded body type and, in some instances, a combination of both. In those valves using a threaded body, the valve body is threadedly secured in the flow line so as to become a unitary part of the line. In the event that maintenance, repair or replacement of the valve becomes necessary, it is necessary to disassemble a portion of the flow line to disconnect and remove the valve. Where a flanged valve body is used, the problem of removing or disconnecting the valve body is less laborious and time-consuming than in the case of the threaded valve body, as it merely requires the removal of the flange bolts which serve to connect the flanged valve body to suitable flange members forming part of the flow line. However, in a flanged valve body, in contrast to the threaded valve body, a serious seal problem exists between the faces of the abutting flanges. This is commonly resolved by using some form of gasket material to prevent leakage and effect a seal. However, such seals are subject to rapid deterioration and require considerable replacements and preventative maintenance in order to avoid leaks, particularly under high pressure. Thus, though the threaded type of valve body does not have any significant leakage problem, it is difficult and time-consuming to remove such a threaded valve body for purposes of maintenance, repair or replacement, which necessarily involves expensive downtime for the flow line. On the other hand, the conveniently removable flange type of valve body involves less down-time for removal, but requires more frequent maintenance because of the above-described leakage problem.

Although rotary valve members tend to have lower friction losses and more effective flow control and modulation than other types of valve structures, there is a problem, particularly in high pressure flow systems for the valve member to shift or rotate in response to the pressure force exerted upon it by the fluid flow so that a predetermined flow setting, without some form of locking means, cannot be maintained using simple and uncomplicated valve adjusting arrangements.

SUMMARY OF THE INVENTION

It is a primary object of the invention to provide an improved frictional lock arrangement which will tend to lock the valve member against any shifting or rotation of position as a result of liquid flow pressures, without in any way interfering with easy and direct manipulation of the valve for desired flow adjustment purposes.

It is another object of the invention to provide an improved seal for a ball valve structure.

Still another object of the invention is to provide an improved mounting arrangement for a valve which will permit it to be quickly uncoupled and swung out of position for maintenance or repair without completely disconnecting it from the flow line.

Other objects and advantages of the invention will become apparent during the course of the following description and with reference to the following drawings in which like numerals are used to designate like parts throughout the same.

DESCRIPTION OF THE PREFERRED EMBODIMENTS

Figure 1:
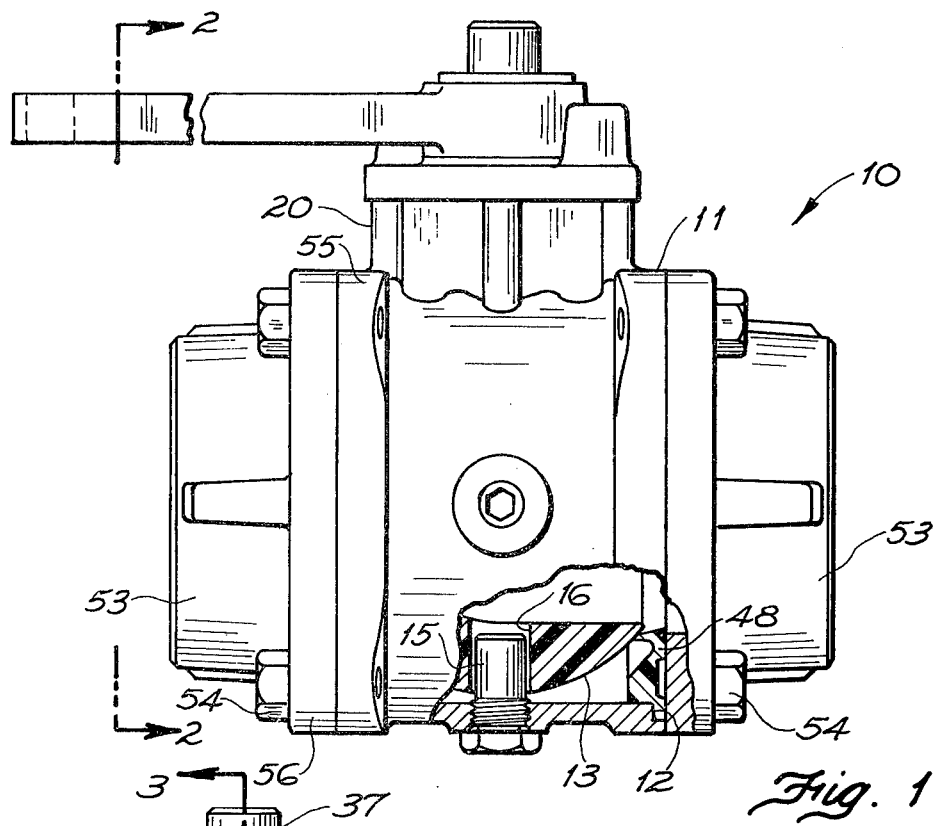
FIG. 1 is a view in elevation of a valve structure embodying the features of the invention, portions thereof being broken away to show certain details.

Referring more particularly to FIGS. 1–4 of the drawings, the valve 10 is seen to consist of a substantially cylindrical valve body 11, the open ends of which are counterbored to provide an inwardly directed circumferential recess 12. The valve includes a rotatably mounted valve element, here shown as a ball 13 having a central flow opening 14 extending therethrough at substantially right angles to its axis of rotation. This axis of rotation is defined by a pivot pin or rod 15 which is threadedly secured through the wall of the valve body 11 and projects into a bore 16 in the ball 13 to provide a journal therefore. The diametrically opposite pole of the spherical ball 13 is recessed as at 17 for driving connection with the tongue 18 of a drive trunnion 19 which is mounted for axial rotation in the valve body coaxially with the axis of rotation of the ball.

That portion of the valve body which provides the housing 20 for the drive trunnion 19 includes a bore 21 to rotatably receive the lower or connector part 22 of the trunnion which is provided with a circumferential recess to receive an O-ring 23 to prevent fluid leakage through the bore 21. The bore 21 is counterbored as at 24 to provide a shoulder 25 on which a circumferential flange or collar 26 of the connector part 22 rests or seats to properly position the connector part 22 and retain it against further downward displacement. The counterbore 24 also provides a machined wall surface 28 coaxial with the connector part 22 and defining an annular space 27 therearound. A cap 29 having a central opening 30 therein overlies the top of the connector part 22 and is secured, as by fasteners 31 to the top of the trunnion housing 20.

The drive part 32 of the trunnion 19 is provided with a circumferential collar 33 which is rotatably journalled in the opening 30 of the cap 29 and has a downwardly projecting portion 34 which serves as a dowel or pivot pin and is received in a bore 35 of the connector part 22. The collar 33 rests upon the upper end of the connector part. A stem 36 projects upwardly above the collar 33 and is desirably of polygonal cross-section so that a wheel or handle can be detachably secured thereto to manipulate the valve whenever desired. A suitable indicia mark 37 is preferably provided on the top of the stem to give visual indication of the position of the opening 14 of the ball element 13.

A slot or groove 38 is provided in the upper portion of the connector part 22 to loosely accomodate a somewhat narrower tongue 39 of the drive part 32 which serves as a driving connection between the part 32 and the part 22 to effect angular rotation of the connector part 22 and of its attached ball element 13 in response to rotation of the drive part 32 of the trunnion. It will be noted that there is a clearance space 40 between the tongue 39 and the opposite walls of the groove 38 so that there can be a small degree of angular rotation of the connector part 22 relatively to the drive part 32. This extent of lost motion between the two parts is of small magnitude but is sufficient to accomplish the purpose hereinafter described. At one end thereof, the groove 38 is notched as at 41 to provide an enlarged space defined by the opposing walls 42 of the notch and the adjacent opposed surfaces of the tongue 39.

A resilient contractable clutch means 43, here shown as a coil spring 44, is prestressed and positioned in the annular space 27 of the housing 20 so as to snugly frictionally embrace the wall of the housing provided by the counterbore 24. The ends 45 of the spring 44 are inwardly directed and spaced from each other so as to straddle the tongue 39 and be received in the space defined between the opposing walls 42 of the notch 41. The spring 44 is so sized in relation to its function that neither of the ends 45 exert any force upon either the connector part 22 or the drive part 32. The frictional engagement of the spring 44 with the wall 28 is sufficiently great to prevent any free movement of the trunnion 19.

As is well known in the art when the ball element 13 is rotated so that the ball opening 14 is aligned with the direction of fluid flow in the line in which the valve is connected then the valve is fully open. As the ball is rotated to progressively block off increasingly greater portions of the opening 14, the effective flow size of the opening 14 is diminished and the flow of fluid therethrough is also reduced. When the ball has been turned or rotated approximately 90° or to a point at which the opening 14 no longer has any communication with the open ends of the valve body 11, the passage of fluid is completely blocked and the valve is completely closed. This manipulation of the ball element 13 is accomplished by rotation of the drive part 32 in one direction or the other which, in turn, is transmitted through tongue 39 and groove 38 to the connector part 22 which is secured to the valve element 13. In the illustrated structure, there could be on the order of 2° to 8° of lost motion between the angular rotation of the drive part 32 and the angular rotation of the connector part 22 as above noted. This lost motion, allows the tongue 39 to engage one or the other of the spring ends 45 (depending upon the direction of rotation) and tends to urge these ends slightly further apart so as to cause a slight further contraction of the spring 44 relieving the locking action of the spring and permitting rotation of the trunnion 19. As soon as the force of the tongue 39 on one of the spring ends 45 is relieved, the spring 44 again tends to expand and secure itself frictionally against further movement in the annular space 27. It will be understood that during the angular rotation of the drive part 32 the spring 44 will be rotated contemporaneously.

However, as previously mentioned, in this type of rotatable valve structure, as the ball is rotated to diminish fluid flow in opposition to the pressure and velocity of the fluid stream in the flow line, there are constantly increasing forces acting upon the walls of the opening 14 which tend to urge the ball toward its fully shut position where it offers the most resistance to fluid flow. Such a pressure-induced movement of the ball element would be arrested by abutment of one or the other of the opposing walls 42 of the notch 41 with an end 45 of the spring and any continued tendency toward such movement would be resisted by the tendency of the spring to expand into tighter frictional locking engagement with the wall 28 as one end of the spring tends to be brought slightly closer to the other by the force exerted thereon due to the lost motion movement of its adjacent wall surface 42. The stronger the force on the ball element 13 tending to displace it from its adjusted setting, the greater the locking action of the spring 44 to resist such displacement. Thus the coil spring 44 provides a clutch means for the trunnion 19 which permits relatively unhindered rotation of the valve element 13 when such rotation is initiated through manipulation of the drive part 32 but locks the trunnion against any angular rotation when such rotation is initiated through the valve element 13 or its associated connector part 22 in opposition to the desired setting or adjustment of the valve established by rotation of the drive part 32.

Figure 5:
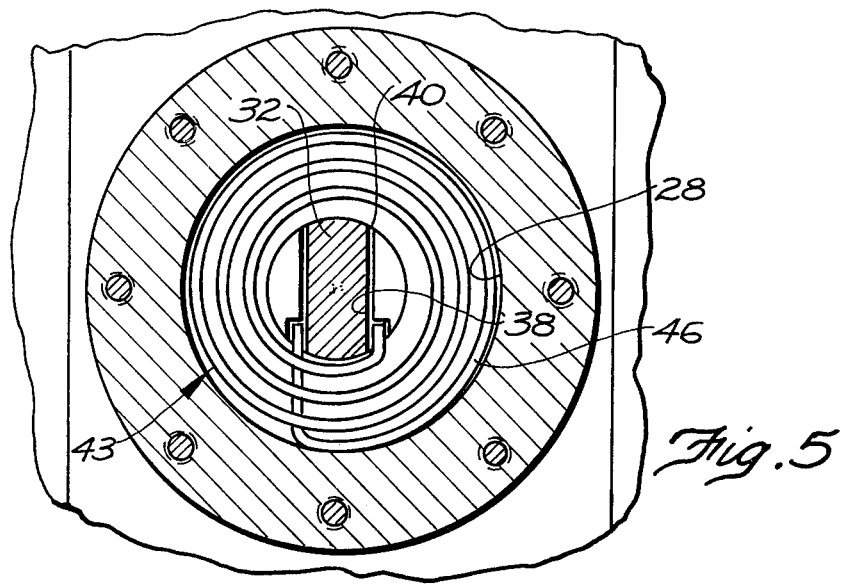
FIG. 5 is a cross-sectional view similar to FIG. 4, but showing a modified form of the invention.
Figure 6:
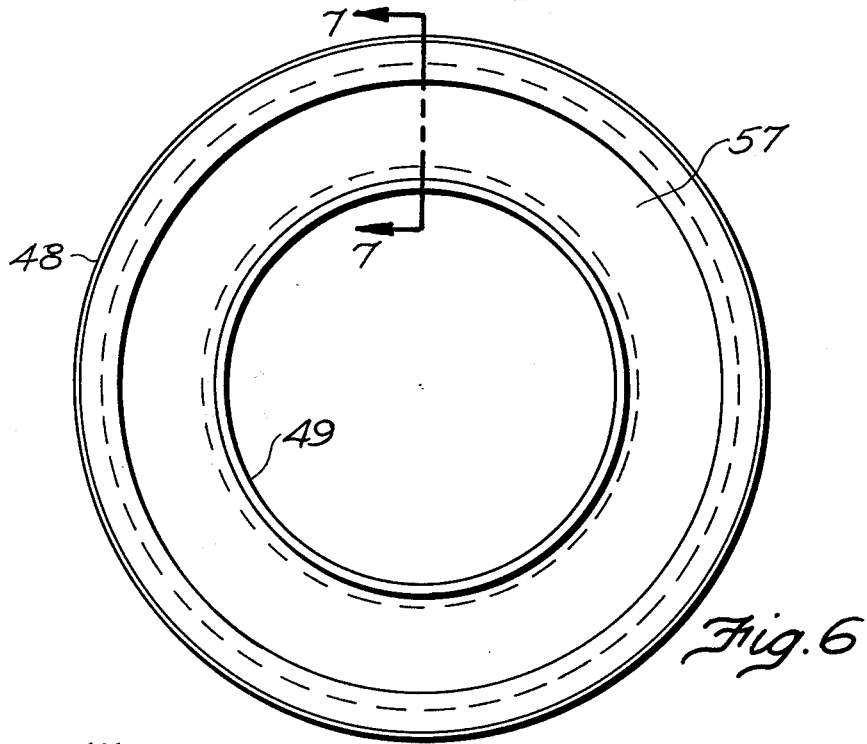
FIG. 6 is a plan view of the seal.
Figure 7:
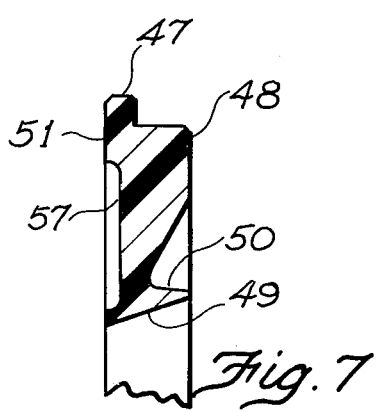
FIG. 7 is a fragmentary cross-sectional view, taken as indicated on line 7—7 of FIG. 6 showing details of the configuration of the seal.

In FIG. 5 of the drawings, there is shown a modified form of clutch means 43 utilizing a spiral wound spring 46 which will function in the same manner as the previously described coil spring 44 to frictionally engage the wall surface 28 and lock the trunnion 19 against pressure-induced movement while permitting unhindered adjustment and setting of the valve by means of the drive part 32. The principles of operation of the spiral spring are the same as previously described for the coil spring. A portion of the spring 46 may be apertured to permit traverse thereof by the outer end.

As best seen in FIGS. 2, 3, 6 and 7 of the drawings, the opposed recesses 12 of the valve body 11 are adapted to accomodate the marginal edge 47 of a flexible, self-sustaining annular seal element 48 which is preferably molded of a suitable synthetic resin. The seal element 48 is provided with a central opening 49 defined by an angular conically divergent lip portion 50 which is of relatively thin section and seats on the spherical surface of the ball element 13 so as to be substantially coaxial with the opening 14 when the valve is in its fully opened position. The lip diverges toward the surface of the ball. The opposite face 51 of the seal 48 abuts the adjacent surface 52 of a flanged coupling element 53 which is secured to the valve body 11 by suitable fastening means such as bolts or cap screws 54 extending through apertured ears 55 which are provided on the valve body 11 and on the flange 56 of the coupling element 53. The end of the coupling element 53 opposite the flange 56 is illustrated as being provided with a female thread for suitable securement to other elements of the flow line, but this could optionally also be a flanged portion or any other suitable form for connection into the flow line.

When the coupling elements 53 are secured to the valve body 11 by means of the fasteners 54, the marginal edge 47 of each of the seal elements 48 is slightly compressed between the surface 52 and the bottom of the recess 12 to effect a fluid-tight seal between the valve body 11 and each of the coupling elements 53. At the same time, the lip portions 50 of each of the seal elements is brought into sealing engagement with the spherical surface of the ball element 13. If the fluid flow is from left to right as indicated by the arrow on FIG. 3 of the drawings, the divergent conical configuration of the lip portion 50 at the intake end of the valve encourages the fluid pressure to flex the lip portion slightly away from its seat on the ball and permit a build-up of fluid under pressure within the valve body 11 around the exterior of the ball. This fluid pressure acts on the underside or exterior surface of the lip portion 50 at the discharge end of the valve body to force the lip more tightly into sealing engagement against the ball and, in effect, wedge the seal between the exterior surface of the ball 13 and the surface 52 of the coupling element, thus preventing any leakage between the ball and the seal or between the coupling element and the seal. Inasmuch as both seal elements 48 are identical, the principle of operation of the seal as described will be effective regardless of the direction of flow of the fluid through the valve. An annular recess 57 may be provided in the face 51 of the seal to increase the flexibility of the seal element.

In high pressure applications, where such valves 10 are often utilized, the lip 50 of the seal could easily be deformed permanently beyond its elastic limit and its sealing effect destroyed, as it must necessarily have less elasticity than a material such as soft rubber in order to properly seat and seal on the ball 13. In order to avoid such deformation, it is advisable that the fluid pressure on opposite sides of the upstream lip 50 be equalized before such pressure on one side of the lip reaches a value where deformation might occur. One practical method of accomplishing this is to have the bore 16 of the valve ball of slightly greater diameter, e.g. 1/32 inch greater, than the diameter of the pivot element 15 on which it is journalled. This permits a slight displacement of the ball 13 in the direction of fluid flow to relieve the sealing effect of the lip 50 on the intake end of the valve and enhance the sealing of the lip 50 on the downstream end. This provides less hindrance and obstruction to fluid flow between the lip and ball on the upstream end and permits a rapid build-up of fluid around the ball in the valve body 11 to equalize the pressure on the opposite sides of the lip 50 and the upstream seal 48 before any permanent deformation can occur. Although this is the preferred means for accomplishing such pressure equalization, other means such as described below, may also be utilized, in which case the bore 16 need not be made oversize as above described.

Figure 8:
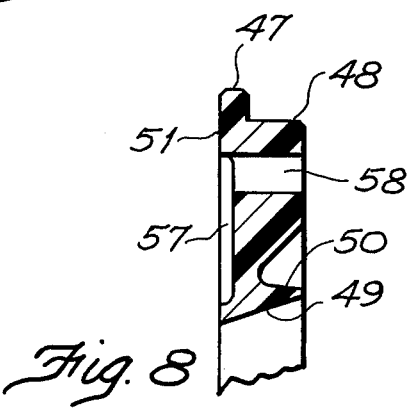
FIG. 8 is a view similar to FIG. 7 showing a modification of the seal.

As best seen in FIG. 8, one or more openings 58 may be provided transversely of the seal in communication with the recess 57. The openings 58 permit trapped pressure between the seals to bleed off between the surfaces 51 and 52 so that the seal will not be flexed or distorted beyond its flexible limit.

Figure 2:
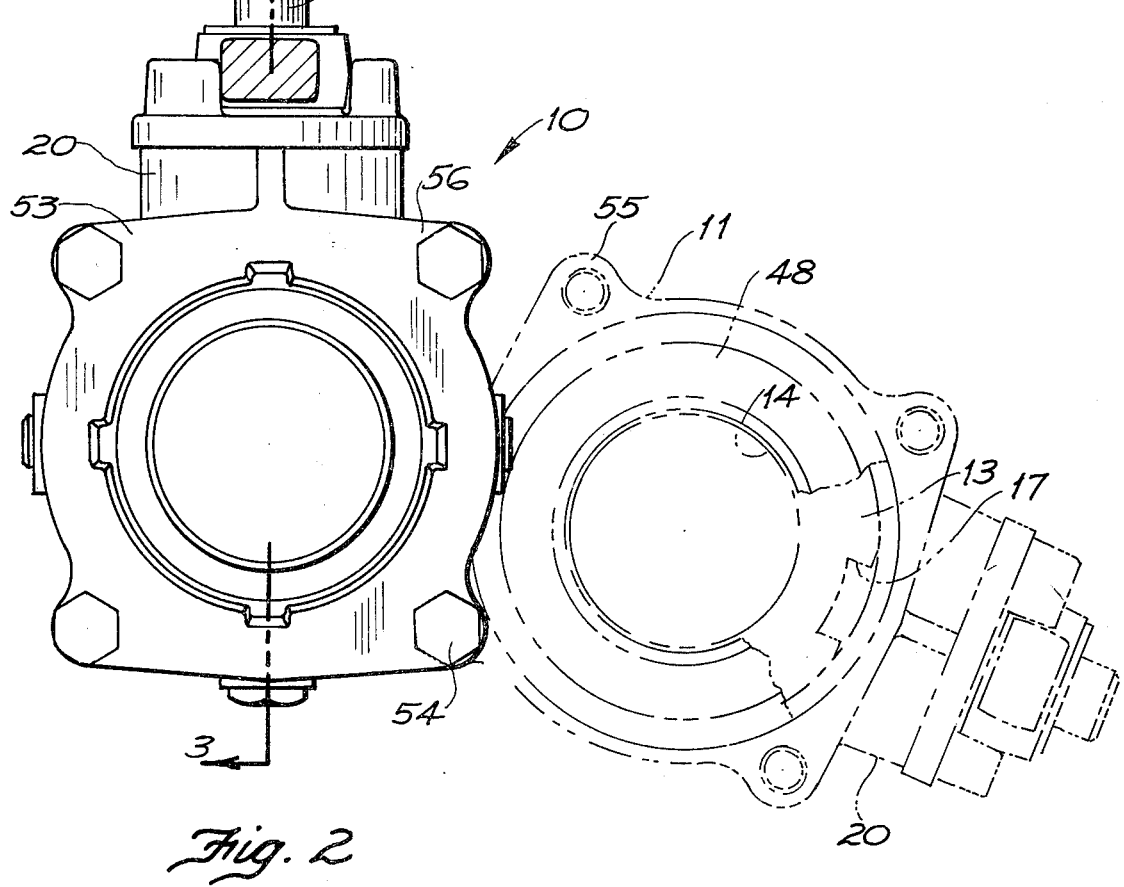
FIG. 2 is a cross-sectional view, taken as indicated on line 2—2 of FIG. 1 and showing the uncoupled position of the valve in phantom outline.
Figure 3:
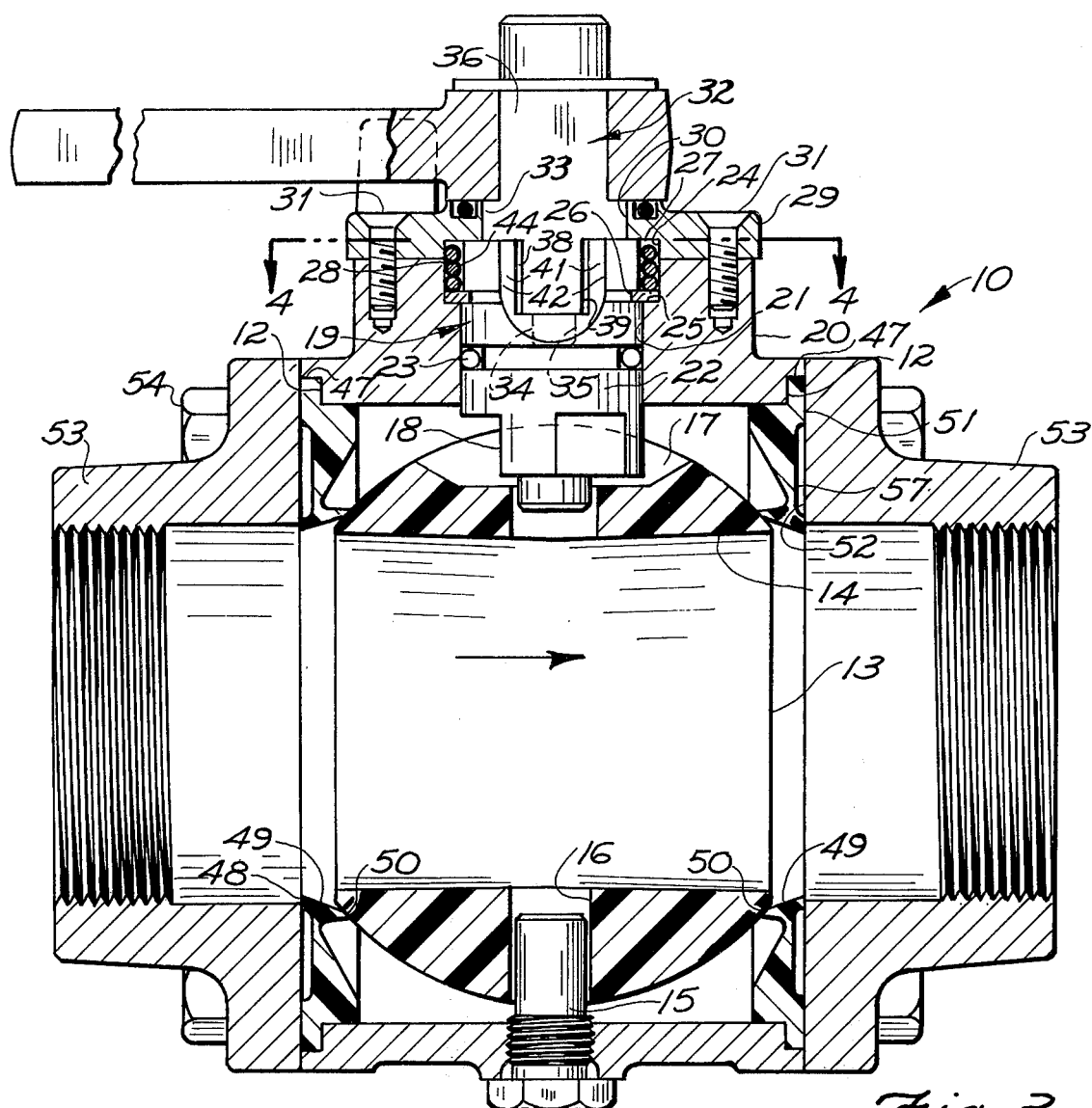
FIG. 3 is an enlarged cross-sectional view, taken as indicated on line 3—3 of FIG. 2.
Figure 4:
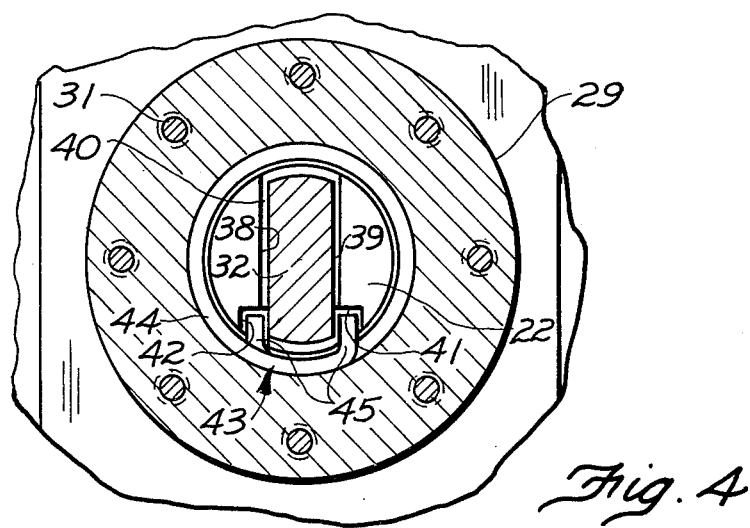
FIG. 4 is an enlarged cross-sectional view, taken as indicated on line 4—4 of FIG. 3.

As best seen in FIG. 2, when all but one pair of aligned fasteners 54 are removed, the remaining pair of fasteners provide an axis of rotation permitting the valve body to be swung out between the coupling elements 53 so that access can be had to the interior of the valve body. This permits inspection, repair or replacement of the interior components of the valve without the necessity of completely removing the valve from the flow line. The seal elements 48 are free of connection or attachment to the coupling elements 53 or to the valve body 11, so they do not interfere with the pivotal movement of the valve body for inspection or maintenance purposes. The seal elements 48 are flexible and self-sustaining in contrast to the compressible type of gasket or seal conventionally used, so that the separation of the seal from its assembled position on the valve creates no problem of replacement if the seal is otherwise in good condition. Upon completion of the necessary inspection or work on the valve, the valve can be swung back into its assembled relationship to the coupling elements 53 and again secured by the bolts 54.

It is to be understood that the forms of my invention, herewith shown and described, are to be taken as preferred examples of the same and that various changes in the shape, size and arrangement of parts may be resorted to, without departing from the spirit of my invention, or the scope of the subjoined claims.

Having thus described my invention, I claim:

1. In a fluid flow control valve, the combination of a valve body, a flow control valve member mounted for axial rotation in said valve body, an adjustable control assembly rotatably mounted in said valve body and engaging said valve member to effect selective angular rotation thereof, said control assembly comprising a connector part engaging said valve member and a driver part operatively coupled to said connector part, and said control assembly including resilient contractible clutch means frictionally engaging said valve body and having end portions thereof disposed between said connector part and said drive part in the path of angular rotation thereof, said end portions being responsive to rotation of said drive part to cause contraction and release of said clutch means and being responsive to valve member-induced rotation of said connector part to cause expansion and locking of said clutch means on said body.

2. A combination as defined in claim 1, wherein said valve member is a ball having a fluid flow opening extending therethrough.

3. A combination as defined in claim 1, wherein said clutch means is a pre-stressed spring.

4. A combination as defined in claim 3, wherein said clutch means is a helical coil spring.

5. A combination as defined in claim 3, wherein said clutch means is a spiral spring.

6. A combination as defined in claim 1, wherein there is a lost-motion connection between said connector part and said drive part.

7. A combination as defined in claim 1, wherein said end portions are responsive to rotation of said parts in either direction.

* * * * *